Patented Feb. 14, 1950

2,497,810

UNITED STATES PATENT OFFICE 2,497,810

PRODUCTION OF PEROXIDE SOLUTIONS

Donald J. Campbell and Edward F. Lefson, Niagara Falls, N. Y., assignors to E. I. du Pont de Nemours & Company, Wilmington, Del., a corporation of Delaware No Drawing. Application May 19, 1949,
Serial No. 94,267

16 Claims. (Cl. 23—207)

This invention relates to the production of aqueous hydrogen peroxide solutions and more particularly, to the conversion of metal peroxide compounds to hydrogen peroxide by a cation-exchange process.

It is known that neutral or acid solutions of hydrogen peroxide can be made by reacting with acid, alkaline peroxide solutions such as solutions of sodium peroxide or other metal peroxide compounds such as alkali metal perborates, borax peroxide and the like. Similarly, hydrogen peroxide solutions have been made by reacting the relatively insoluble barium peroxide with an acid; and generally an acid such as sulfuric acid is used which causes precipitation of the resulting barium salt. These methods for producing hydrogen peroxide solutions have the disadvantage that the solutions invariably contain a greater or less amount of salts, which for many purposes is disadvantageous. Also, the metal peroxides or peroxide compounds which can be thus used to make hydrogen peroxide in their commercial forms generally contain appreciable amounts of heavy metal impurities, such as iron, copper or the like, which catalyze the decomposition of hydrogen peroxide, causing a loss of active oxygen.

The least expensive commercial peroxide is sodium peroxide which advantageously is employed to prepare alkaline peroxide solutions, for example, those used for bleaching cellulosic materials. For other purposes, for example, wool bleaching, where strongly alkaline solutions cannot be used, the more expensive hydrogen peroxide generally is employed. For such purposes a method is desired for converting sodium peroxide to a hydrogen peroxide solution substantially free from sodium salts.

It is known that alkaline solutions, such as sodium hydroxide solutions, can be neutralized by treatment with acidic cation-exchange materials, to produce salt-free water. Assuming that a solution of sodium peroxide is composed essentially of sodium hydroxide and hydrogen peroxide, it would appear that by means of conventional cation-exchange methods it could readily be converted to a pure hydrogen peroxide solution, by removal of the sodium ions. However, in investigating this possibility, we have experienced great difficulty in accomplishing such conversion without excessive peroxide decomposition. Most of the available cation-exchange materials which are suitable for removing sodium ions from caustic soda solutions cannot be used to treat peroxide solutions without causing excessive loss of active oxygen, in the order of 30% loss, in spite of any remedial measures known to us. The only cation-exchange bodies which we can successfully employ without undue peroxide decomposition are organic in nature; and these require special treatment as hereinafter described.

An object of the present invention is a novel and useful process for converting peroxide compounds containing metal ions to hydrogen peroxide solutions. A further object is to produce hydrogen peroxide solutions substantially free from metal ions. Another object is to remove alkali metal ions and other metal ions from peroxide solutions without undue loss of active oxygen. An object also is to treat or modify certain cation-exchange bodies to inhibit their tendency to cause peroxide decomposition in aqueous solutions. Still other objects will be apparent from the following description of the invention.

In accordance with the present invention, the above objects are attained by bringing a metal peroxide compound in aqueous medium into contact with a specially treated cation-exchange resin. The cation-exchange resin suitable for use in this invention are synthetic resins which constitute a well-known class of cation-exchange materials which can be utilized to remove alkali metal ions from aqueous solutions of alkali metal compounds. We have investigated a variety of cation-exchange materials for this purpose and have found that by utilizing the synthetic resin type, we can operate with little or no peroxide decomposition; whereas with other types of cation-exchange bodies, which are effective in peroxide-free solutions, we are unable to avoid high losses of active oxygen. We have further discovered that even the synthetic resin type of cation-exchange resin, without special treatment hereinafter described, acts in some manner to cause excessive loss of active oxygen.

We have discovered that this tendency of the cation-exchange resins to cause peroxide decomposition can be inhibited or practically eliminated by giving the resin a drastic acid treatment. Before using any cation-exchange resin to remove metal ions from an aqueous solution, the resin must, of course, be in the acidic state. If the exchange resin has been spent by absorption of metal cations, for example sodium ions it is conventionally regenerated by treatment with an acid sufficient to replace adsorbed alkali metal ions with hydrogen ions. We have found that a conventionally regenerated or acidified cation-exchange resin placed in contact with a peroxide solution tends to cause considerable decomposition often resulting in losses up to 50% or more of the peroxide concentration. We have further discovered that if the acidified or regenerated catalyst is given a further acid treatment, equivalent at least 2 times the treatment required for mere regeneration, the resulting peroxide decomposition can be almost completely eliminated. Preferably, we subject the cation to an acid treatment equivalent to 2 to 5 times that required for mere acidification or regeneration.

We have found that the function of the excess acid treatment is to remove polyvalent heavy metal ions which we believe are responsible for the peroxide decomposition. The cation-exchange resins as purchased almost invariably contain small amounts of such heavy metal ions such as iron, lead and copper which are known peroxide decomposition catalysts. Thus, we have found such resins to contain from 50 to 2400 parts per million of iron. We have also found that when the resin is treated with acid until substantially free from iron, it can be used to convert sodium peroxide to hydrogen peroxide with little or no loss of active oxygen. Further, we have found that to be effective the acid utilized must be substantially free from iron and other polyvalent heavy metals. Generally, if the acid is sufficiently pure to give a negative test for iron with the standard thiocyanate test, it will be sufficiently free from other catalytic polyvalent heavy metal ions.

Our experience shows that acid treatment sufficient to completely remove alkali metal ions from the cation-exchange resin does not remove the polyvalent heavy metal ions. For example, the resin, in the alkaline state is regenerated by passing a strong acid solution through a bed of the granular resin until the pH of the effluent suddenly drops or reaches a point where further acid treatment produces substantially no change in pH. At this point, the resin is in the acid state and will readily remove sodium ions from solution. However, when sodium peroxide solution is passed through the regenerated resin bed, the yield of hydrogen peroxide is low, due to peroxide decomposition.

When the resin bed is regenerated as above described, the acidic effluent will show a positive test for iron. If the acid washing is continued sufficiently long, the test per iron finally will be nil, or very faint. This generally requires from 2 to 5 times the acid treatment used for regeneration. After such excess acid treatment, the passage of sodium peroxide solution through the resin bed produces hydrogen peroxide in good yield, until it becomes spent by the adsorption of sodium ions. After each subsequent regeneration, the excess acid treatment is necessary to remove iron adsorbed from the sodium peroxide solution.

In a preferred method for regenerating and treating the cation-exchange resin in accordance with our invention, a solution of a strong acid, such as hydrochloric, sulfuric or nitric acid in concentration of from 2 to 20% by weight, is passed through a bed of the granular resin and the effluent from the resin bed is continuously passed through a conventional pH meter equipped with a glass electrode system whereby the pH of the effluent can be measured. When the acid has substantially completed replaced alkali metal ions with hydrogen the pH suddenly decreases to approximately that of the inflowing acid. The amount of acid which then has passed through the resin bed to accomplish such regeneration is noted, and the flow of acid is continued at the same rate until the total amount of acid which has passed through the resin bed is from 2 to 5 times as great as that which has passed through when the decrease in conductivity occurred. For this continued treatment, the acid must be substantially free from iron and other polyvalent heavy metal ions. If desired, the effluent may be periodically tested for iron and the acid treatment discontinued when the iron test is negative or substantially so. The resin so treated generally can be contacted with alkaline peroxide solutions and will cause little or no peroxide decomposition.

Freshly prepared cation-exchange resin, or as supplied by manufacturers, generally is in the acidified state and does not need acid treatment for cation-exchange operations in peroxide-free solutions. For our purpose, such acidic resin requires an acid treatment, to avoid peroxide decomposition.

It is also advantageous to add to the peroxide solution undergoing treatment a suitable stabilizer which is capable of inhibiting peroxide decomposition. Any of the conventional peroxide stabilizers are suitable for this purpose and as such stabilizers and methods for applying them are well known they need not be fully described here. For the conversion of sodium peroxide to hydrogen peroxide we prefer to add to the sodium peroxide as stabilizer, 0.1 to 1.0% by weight of sodium silicate. Alternatively, or in addition to the sodium silicate, we may add as stabilizer or a water soluble magnesium salt in an amount 0.02 to 0.05% by weight or 0.1 to 0.5% by weight of a soluble pyrophosphate, or both.

In one method of practicing our invention, a granular cation-exchange resin which is essentially composed of a sulfonated formaldehyde condensation product of a polyhydric phenol and which has been treated with a strong acid as described above is arranged as a bed of suitable thickness as in conventional base-exchange operations. An aqueous solution of sodium peroxide containing 0.35 to 7.2% by weight of sodium peroxide is passed through the bed of cation-exchange resin, for example, by gravity flow. The resulting effluent is a substantially metal-free, non-alkaline hydrogen peroxide solution. The pH of the effluent is continuously measured by conventional electrometric means and when the pH increases to above pH 7 the flow of sodium peroxide is stopped. The catalyst is then regenerated and additionally treated with acid as described above.

Preferably, in carrying out this operation, the sodium peroxide solution will contain a suitable stabilizer, such as sodium silicate or a combination of magnesium sulfate and sodium pyrophosphate, in suitable concentrations as described above. We have found that some heat is developed in the cation-exchange resin during the reaction and in order to still further decrease active oxygen loss it is advantageous to precool the sodium peroxide solution before passing it through the base-exchange resin. Preferably, we precool the peroxide solution sufficiently so that the mean temperature in the cation-exchange resin bed, for example, as measured with a thermometer placed approximately in the center of the bed, is maintained at about 10 to 30° C. Best results are obtained when this temperature is maintained at 10 to 15° C., by precooling to 5 to 10° C.

We have further found that best results are obtained when the alkalinity of the peroxide solution passing into the basic exchange bed is kept to a minimum, which is equivalent to a sodium peroxide concentration not greater than 4% by weight. At such relatively low alkalinity and at the above preferred reaction temperature and use of suitable stabilizer, we are able to decrease the active oxygen losses so that active oxygen recoveries in the range of 90 to 99% can regularly be obtained. If the solution is precooled but no stabilizer is utilized, generally the active oxygen yield is in the neighborhood of 80 to 90%. However, if the base-exchange resin is not given the above described excess acid treatment but is merely acidified or regenerated in the conventional manner, the active oxygen yields generally drop to 50 to 70%, even with precooling and employment of stabilizer.

In practicing the invention as above described, the peroxide concentration, expressed in terms of active oxygen, will approach, but will not exceed, that of the peroxide compound passed into the base-exchange bed. We can, however, produce higher concentration by cyclic methods. In such methods a hydrogen peroxide solution is continuously recirculated through the base-exchange bed by means of a suitable pump and solid sodium peroxide or other suitable solid, water-soluble metal peroxide compound is introduced into the circulating stream before it reenters the base-exchange bed.

For this purpose, we prefer to arrange a tank or other suitable reservoir equipped with a stirring device and permit peroxide solution to flow by gravity from the tank through the base-exchange bed, pumping the effluent back into the tank. The metal peroxide compound is continuously added to the solution in the tank with agitation sufficient to rapidly dissolve it. When this method is used for converting sodium peroxide into hydrogen peroxide, the rate of introduction of the solid sodium peroxide is so limited that the concentration of sodium peroxide in the solution entering the cation-exchange bed does not exceed about 4% by weight and preferably is maintained at 0.5 to 2.5% by weight of sodium peroxide. In this manner, a higher concentration, up to 20 to 30% by weight of hydrogen peroxide, may be built up in the circulating solution. When the desired concentration has been reached, the addition of sodium peroxide is stopped and the recirculation continued until all alkali metal ions have been adsorbed by the cation-exchange bed.

In carrying out this method, we prefer to utilize a cation-exchange bed of sufficient size or capacity so that no regeneration is necessary before the desired peroxide concentration has been built up in the recirculation solution. Alternatively, we may use base-exchange beds of smaller size or capacity and either stop the process for regeneration when necessary or arrange a plurality of beds and switch from one to the other as they require regeneration. This recirculation method may be used to produce hydrogen peroxide from other metal peroxide compounds.

The invention is further illustrated by the following examples:

Example 1

In a series of tests, using several granular cation-exchange resins, aqueous sodium peroxide solutions were converted to hydrogen peroxide solutions by passing the peroxide solution through a bed of the resin. In regenerating the resin, acid (6% sulfuric acid or 10% hydrochloric acid) was passed through the resin bed at constant rate and the pH of the effluent was continuously measured with a conventional electrometric pH meter. A rapid or sudden decrease in pH, from alkaline to acidic condition, indicated the point at which regeneration was complete (complete replacement of alkali metal ions by hydrogen ions), placing the resin in the acid or hydrogen condition. At that point, the volume of acid passed through the acid was measured; and, in certain cases, the acid treatment was continued at the same flow rate. The total volume of acid passed through the resin was measured. The "Ratio" in the following table is the ratio of the total volume of acid passed through the resin bed to the volume of acid required to produce the sudden decrease in pH indicating regeneration.

The resins employed were the sulfonated phenol-formaldehyde condensation products "Ionac-C200" supplied by the American Cyanamid Company and "Amberlite IR–100H" supplied by the Rohm and Haas Chemical Corporation. In the table below they are designated "Ionac" and "Amb.," respectively.

The table below shows the concentration of the sodium peroxide feed, the pH of the hydrogen peroxide effluent and the per cent yield of active oxygen:

| Test | Acid Treatment | | | $NA_2O_2$, Conc'n. | $H_2O_2$ Produced | |
|---|---|---|---|---|---|---|
| | Resin | Acid | Ratio | | pH | Active $O_2$ Yield |
| | | | | Per Cent | | Per Cent |
| A | Ionac | None [1] | | 1.4 | 4.6 | 53.3 |
| B | do | $H_2SO_4$ | 2:1 | 1.4 | | 82.4 |
| C | Amb | HCl | 1:1 | 1.4 | 3.5 | 58.5 |
| D | Ionac | do | 3:1 | 1.4 | | 90.7 |
| E | do | do | 2.1:1 | 1.4 | 4.1 | 96.2 |
| F | Amb | $H_2SO_4$ | 3:1 | 1.4 | 5.0 | 72.5 |
| G | do | HCl | 2.5:1 | 1.4 | 2.0 | 97.7 |
| H | do | do | 3.3:1 | 1.4 | 1.8 | 97.5 |
| I | do | do | 2:1 | 2.8 | 2.4 | 74.7 |
| J | do | do | 2.3:1 | 2.8 | 2.75 | 96.4 |
| K | do | do | 2:1 | 5.6 | 3.5 | 91.6 |

[1] The resin as received from the manufacture was in the hydrogen condition and was not acid treated.

In tests E, H, I, J and K, the $Na_2O_2$ solution contained the following added ingredients:

| Test | |
|---|---|
| E | Magnesium sulfate, 10 g./l. and sodium pyrophosphate, 3 g./l. |
| H | Magnesium sulfate, 0.5 g./l. and sodium pyrophosphate, 1.5 g./l. |
| I | Magnesium sulfate, 0.5 g./l. and sodium pyrophosphate, 1.4 g./l. |
| J | Magnesium sulfate, 0.5 g./l. and sodium pyrophosphate, 1.5 g./l. |
| K | 42° Bé. sodium silicate solution, 10 g./l. |

In Tests J and K the $Na_2O_2$ solution was cooled before passing it through the resin bed, as follows:

Test J, cooled to 10° C.
Test K, cooled to 15° C.

It is noted that in Tests I and J the $Na_2O_2$ solutions were identical in composition and concentration and the same resin was employed, with substantially the same acid treatment. The cooling employed in Test J resulted in a higher active oxygen yield.

Example 2

The "Amberlite" resin of Example 1 treated with 2.5 times the amount of acid required to remove alkali metal ions, was employed as in Example 1 to convert a 1.4% sodium peroxide solution to a hydrogen peroxide solution. The solution also contained 1 g./l. of magnesium sulfate and 3 g./l. of sodium pyrophosphate.

After regenerating and acid treating the resin as above, sodium peroxide was added to the resulting hydrogen peroxide solution and the mixed solution was passed through the resin bed. This was repeated several times, resulting in a higher hydrogen peroxide concentration each time. The results are shown in the following table:

| Pass | Peroxide Solution Feed | | Active Oxygen Yield |
|---|---|---|---|
| | Per cent $Na_2O_2$ | Per cent $H_2O_2$ | |
| | | | Per cent |
| 1 | 1.4 | ------ | 97.5 |
| 2 | 1.4 | 0.6 | 99.0 |
| 3 | 1.4 | 1.2 | 97.3 |
| 4 | 1.4 | 1.8 | 96.6 |
| 5 | 1.4 | 2.4 | 97.0 |

*Example 3*

An arrangement consisting of a 2 liter reservoir, a stainless steel circulating pump capable of pumping a liter of liquid per minute and a liter column of "Ionac C-200" resin 22 inches deep are employed. The resin is first treated with an amount of acid more than that required to replace alkali metal ions with hydrogen. A feed mechanism for adding sodium peroxide at a preset rate to the reservoir is provided. The reservoir is filled with 500 cc. of sodium peroxide solution of 3 volume concentration and gravity feed started through the exchange column. The effluent is pumped back into the reservoir into which meanwhile solid sodium peroxide is being added at a rate such that the solution passing to the resin bed, although steadily increasing in hydrogen peroxide concentration is kept at 2 to 3 volume concentration with respect to sodium peroxide, i. e. at 1.4 to 2.2% by weight of $Na_2O_2$. After the column is spent so far as its exchange capacity is concerned (indicated by a sudden rise in pH on the effluent side) circulation is stopped, the column is rinsed with water and the resulting strong hydrogen peroxide solution (10 to 13 volume) can be used directly or further concentrated by other methods.

Using this mode of operation, in two trials the following results were obtained:

| Trial | Acid Treatment of Resin Ratio [1] | $H_2O_2$ Conc'n. | Active Oxygen Yield |
|---|---|---|---|
| | | Vol. | Per Cent |
| 1 | 2:1 | 11.2 | 90.8 |
| 2 | 3.2:1 | 13.1 | 93.2 |

[1] Same meaning as "Ratio" in the table of Example 1.

In addition to the foregoing examples, our invention may be utilized to produce hydrogen peroxide solutions from various other metal peroxide compounds. Suitable compounds include the peroxides of the alkali and alkaline earth metals (sodium, potassium, lithium, cesium, rubidium, calcium, barium, strontium and magnesium); other metal peroxides which react with acids to yield hydrogen peroxide, such as zinc and cadmium peroxide; inorganic persalts which react with acids to yield hydrogen peroxide, e. g., the perborates, such as sodium perborate, potassium perborate, cadmium perborate and borax peroxide; and salts of organic peracids. When the reactant is a persalt, the product is an acidic peroxide or peracid solution. For example, the product from borax peroxide or a perborate such as sodium perborate is a hydrogen peroxide solution containing boric acid. The product from a persalt such as an alkali metal peracetate or other alkali metal salt of an organic peracid is a solution of such peracid. In each case the metal peroxide compound is converted into the corresponding hydrogen compound.

The various known cation-exchange synthetic resins may be employed to practice this invention. These are synthetic resins, practically insoluble in aqueous liquids, which contain acid groups and may be considered polymeric acids. The acid groups generally are sulfonic, carboxyl and phenolic. A suitable cation-exchange resin may contain all or one of such groups. A large class of such resins are sulfonated phenol-formaldehyde condensation products, exemplified by those disclosed in Adams et al., U. S. P. 2,104,501. Another well-known group are the sulfonic acid derivatives of vinyl resins containing aromatic groups, such as those disclosed in D'Alelio, U. S. P. 2,366,007. Cation-exchange resins containing the carboxyl group are those made from substances containing that group, for example, salicylic acid - phenol - formaldehyde condensation product. The various types of cation-exchange resins are described in patents and in the chemical literature, e. g. J. Am. Chem. Soc., vol. 70, pp. 2370-3; Analytical Chem., vol. 21, p. 89.

The synthetic cation-exchange resins vary in their capacity (which apparently depends on the proportion of the acid groups) and their ability to withstand repeated contact with acid and alkali without deterioration. We prefer to utilize those resins which have relatively high capacity and which are highly resistant to the action of strong acids and alkalis.

The invention is restricted to the synthetic resin type of cation-exchangers. The carbonaceous type, containing free carbon or coal, such as the sulfonated coals are not suitable. These carbonaceous cation-exchangers cause excessive peroxide decomposition, despite any amount of acid treatment.

Any of the methods conventionally used for contacting aqueous solutions with base-exchange bodies may be employed in practicing our invention.

Our process is useful for preparing hydrogen peroxide solutions of varying concentrations. The solutions so prepared generally are characterized by a high degree of stability because the cation-active material has removed any heavy metal ions which tend to cause peroxide decomposition. The invention provides a means for producing hydrogen peroxide by cation-exchange in high yield, with little or no loss of active oxygen.

We claim:

1. The process for producing hydrogen peroxide which comprises reacting a metal peroxide compound in aqueous medium with an acid-treated cation-exchange synthetic resin, which resin has been subjected to acid treatment at least twice that required to substantially completely remove adsorbed alkali metal ions.

2. The process according to claim 1 wherein the acid treatment is sufficient to substantially completely remove adsorbed ions of polyvalent heavy metals.

3. The process for producing hydrogen peroxide which comprises reacting an aqueous sodium peroxide solution with an acid-treated cation-exchange synthetic resin, which resin has been subjected to acid treatment at least twice that required to substantially completely remove adsorbed sodium ions.

4. The process of claim 3 in which said resin is a sulfonated phenol-formaldehyde condensation product.

5. The process for producing hydrogen peroxide which comprises reacting an aqueous suspension of barium peroxide with an acid-treated cation-exchange synthetic resin, which resin has been subjected to acid treatment at least twice that required to substantially completely remove adsorbed barium ions.

6. The process for producing an aqueous hydrogen peroxide solution which comprises reacting an acidified cation-exchange resin of the sulfonated phenol-formaldehyde condensation type with an aqueous solution of sodium peroxide containing not more than about 4% by weight of sodium peroxide, said cation-exchange resin having been treated with an aqueous acid solution of a strong inorganic acid for a period of time sufficient to substantially completely remove adsorbed iron ions.

7. The process for producing an aqueous hydrogen peroxide solution which comprises reacting an acidified cation-exchange synthetic resin with an aqueous solution of sodium peroxide, said resin having been given an acid treatment two to five times that required to remove adsorbed sodium ions.

8. The process of claim 7 in which the sodium peroxide solution contains 0.1 to 1.0% by weight of sodium silicate.

9. The process of claim 7 in which the sodium peroxide solution contains 0.02 to 0.05% by weight of sodium pyrophosphate and 0.1 to 0.5% by weight of a water soluble magnesium salt.

10. The process for producing a solution of hydrogen peroxide solution substantially free from metal ions which comprises passing an aqueous sodium peroxide solution through a bed of acidified cation-exchange synthetic resin, regenerating the cation-exchange resin material by flowing an aqueous solution of a strong inorganic acid through said bed at a constant flow rate for a period of time sufficient to substantially completely remove iron ions therefrom, and then again passing aqueous sodium peroxide solution through said bed.

11. The process for producing a hydrogen peroxide solution substantially free from metal ions which comprises passing an aqueous sodium peroxide solution not exceeding about 4% by weight concentration through a bed of acidified resinous cation-exchange material continuously measuring electrometrically the pH of the resulting effluent hydrogen peroxide solution and stopping the flow of said sodium peroxide solution when said pH rises above pH 6 to 8, then passing through said bed at a constant flow rate an aqueous solution of a strong inorganic acid selected from the group consisting of hydrochloric, sulfuric and nitric acids, of about 2 to 20% by weight concentration, continuously measuring the pH of the effluent acid, until said pH decreases to approximately that of the inflowing acid solution, then continuing the flow of acid through said bed until the total amount of acid passed through equals 2 to 5 times the amount required to cause the decrease in pH, then again passing sodium peroxide through said bed, as aforesaid.

12. The process of claim 11 in which said sodium peroxide solution contains 0.1 to 1.0% by weight of sodium silicate and before passing through the cation-exchange resin is precooled sufficiently to maintain the average temperature within the cation-exchange bed at 10 to 30° C.

13. The process for converting a metal peroxide compound to hydrogen peroxide which comprises continuously circulating a body of aqueous hydrogen peroxide solution through a bed of an acidified cation-exchange synthetic resin and back into the point of influx into said bed, adding a solid metal peroxide compound to the recirculating solution, said resin first having been subjected to an acid treatment 2 to 5 times that required to remove adsorbed alkali metal ions.

14. The process for converting an aqueous alkaline hydrogen peroxide solution to a hydrogen peroxide solution of higher peroxide concentration which comprises continuously circulating a body of aqueous hydrogen peroxide solution through a bed of an acidified cation-exchange synthetic resin and back to the point of influx into said bed, adding to the recirculating solution solid sodium peroxide at such rate that the sodium peroxide content of the solution entering said bed does not exceed about 4% by weight, said resin first having been subjected to an acid treatment at least twice that required to substantially completely remove adsorbed alkali metal ions.

15. The process of claim 14 in which the peroxide solution entering the cation-exchange bed contains 0.5 to 2.5% by weight of sodium peroxide and 0.1 to 1.0% by weight of sodium silicate, and the circulating solution is cooled sufficiently to maintain the mean temperature within said bed at 10 to 30° C.

16. The process of converting barium to peroxide hydrogen peroxide of higher peroxide concentration which comprises continuously circulating a body of aqueous hydrogen peroxide solution through a bed of an acidified cation-exchange synthetic resin and back to the point of influx into said bed, while adding solid barium peroxide to the recirculating solution, said resin first having been subjected to an acid treatment sufficient to substantially completely remove adsorbed iron ions.

DONALD J. CAMPBELL.
EDWARD F. LEFSON.

No references cited.